United States Patent [19]

Hartig

[11] Patent Number: 5,168,170

[45] Date of Patent: Dec. 1, 1992

[54] SUBSCRIBER ELECTRIC POWER LOAD CONTROL SYSTEM

[75] Inventor: Kent Hartig, Lancaster, Mass.

[73] Assignee: Lexington Power Management Corporation, Wakefield, Mass.

[21] Appl. No.: 404,194

[22] Filed: Sep. 7, 1989

[51] Int. Cl.$^5$ .............................................. H02J 3/12
[52] U.S. Cl. ...................................... 307/35; 307/34; 307/38; 364/493
[58] Field of Search .................... 307/31–35, 307/38–40; 364/483, 492, 493; 340/825.06–, 825.09, 825.22, 310 R, 310 A, 310 CP; 379/102, 104, 105

[56] References Cited

U.S. PATENT DOCUMENTS

| | | | |
|---|---|---|---|
| 4,058,678 | 11/1977 | Dunn et al. | 340/310 CP X |
| 4,204,127 | 5/1980 | Carter, II | 307/39 |
| 4,213,182 | 7/1980 | Eichelberger et al. | 364/493 |
| 4,247,786 | 1/1981 | Hedges | 307/35 |
| 4,337,401 | 6/1982 | Olson | 307/39 |
| 4,347,575 | 8/1982 | Gurr et al. | 364/492 |
| 4,357,665 | 11/1982 | Korf | 364/492 |
| 4,489,386 | 12/1984 | Breddan | 364/493 |
| 4,819,180 | 4/1989 | Hedman et al. | 364/492 |
| 4,847,781 | 7/1989 | Brown, III et al. | 364/492 |

Primary Examiner—A. D. Pellinen
Assistant Examiner—David Osborn
Attorney, Agent, or Firm—Robert T. Dunn

[57] ABSTRACT

Electric power uses or loads in a premises are controlled or managed depending upon whether the use is for heating, hot water, heat pump, air conditioning, lights, appliances, pumps, etc., according to programs that are controlled by the electric Power Company, for the purposes of spreading power uses at the premises over a day or other time interval, to avoid peak load periods encountered by the Power Company, while still providing the normal comfort levels required by the subscriber from the various power uses. Power levels of several uses at the subscriber's premises are sensed and the power for each use is controlled according to a program that includes a schedule of power level and/or the time of day that is inserted in the program or controlled in the program by the Power Company to accomplish the spreading. In a particular embodiment, a programmed computer unit is provided at the premises that is monitored by the Power Company via the subscribers telephone line. Changes in the computer program are inserted in the unit by the Power Company, via the telephone line; and signals within and throughout the premises for detecting and controlling power uses are transmitted to and from the unit over the premises power line.

18 Claims, 13 Drawing Sheets

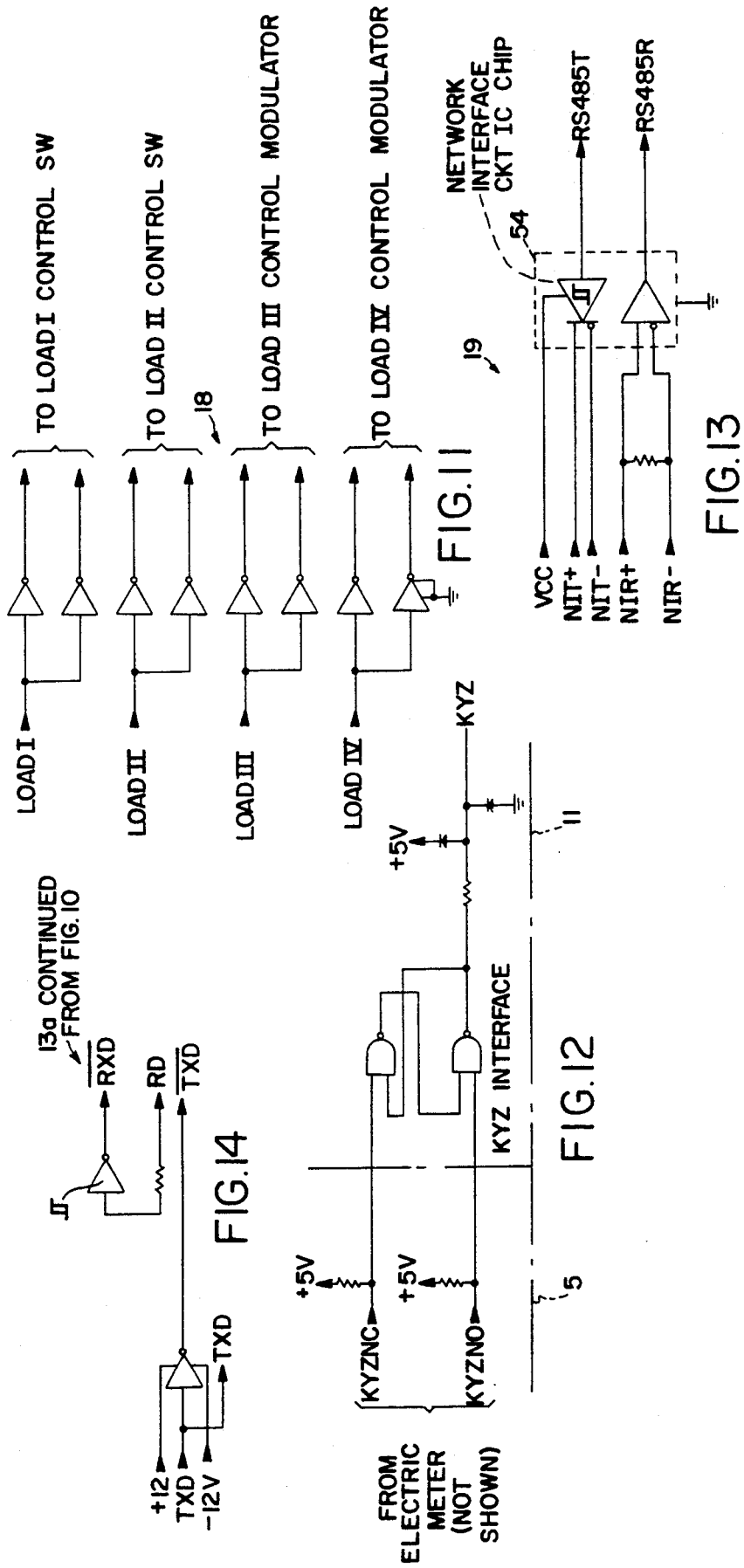

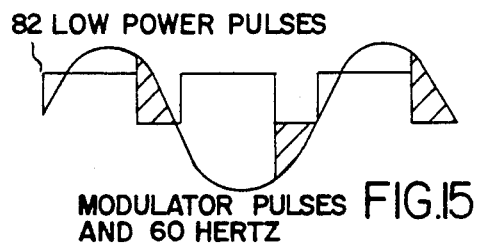
MODULATOR PULSES FIG.15a
AND 60 HERTZ
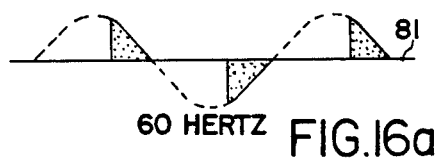
60 HERTZ FIG.16a
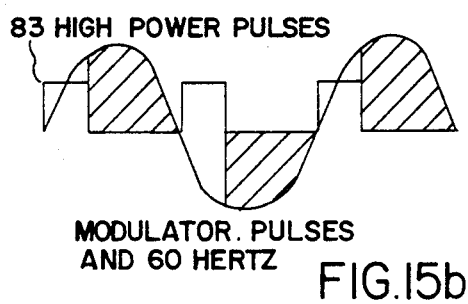
MODULATOR PULSES FIG.15b
AND 60 HERTZ
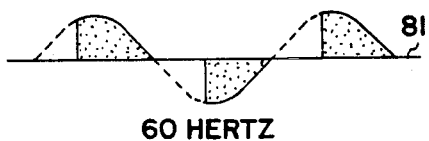
60 HERTZ FIG.16b
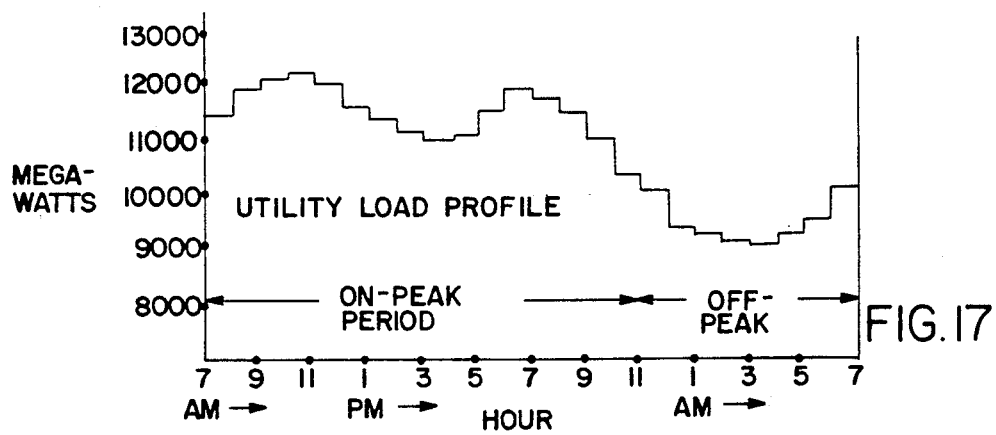
FIG.17
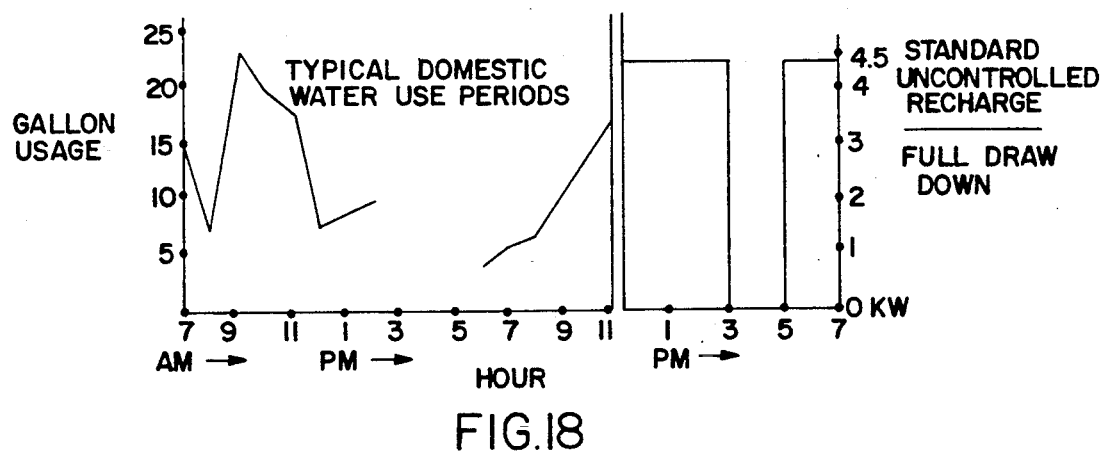
FIG.18

SUBSCRIBER ELECTRIC POWER LOAD CONTROL SYSTEM

BACKGROUND OF THE INVENTION

This invention relates to electric power use controllers at an electric power subscriber's premises that monitor power uses at the premises and control them, and more particularly to such power control systems that control power use according to a predetermined program.

A typical load profile of an electric Power Company that supplies industry, business and dwellings over a twenty-four hour period is shown in FIG. 17. Such profiles usually reveal an on-peak period beginning early in the morning at a level of, for example, 8,000 Megawatts, rising to a level of about 12,000 Megawatts by 11 o'clock AM and then dropping steadily to a level of about 11,000 Megawatts at mid afternoon, only to rise again to the level of 12,000 Megawatts again by 7 PM and thereafter drops throughout the evening and into the early hours of the next day to the 8,000 Megawatt level. Thus, there are two peaks during the day, one at about 11 AM and the other at about 7 PM; and during the off-peak period between 11 PM and 6 AM the next morning, the level falls well below 10,000 Megawatts.

This load profile tends to hold for most days of the year, although a load bias is imposed on particularly hot days when a great deal of air conditioning is demanded and on particularly cold days when electric heat demand is high. During such hot days, the total twenty-four hour period may be on-peak, inasmuch as at all times the load profile is above the 10,000 Megawatt level. It is one object of the present invention to provide a monitoring and control system for use in a subscriber's premises for controlling the several types of uses of electric power in the premises so that the premises uses electric power during the off-peak periods, where possible, rather than during the on-peak periods, without undue loss of subscriber comfort.

Power Companies presently lose millions of dollars each year from the theft of power by subscribers and those who have access to the power lines. The present method of monitoring and verifying power use by industrial subscriber's typically involves electronic meters with a remote sensing ability. Such meters are polled remotely via modems on existing phone lines. Currently, such remote sensing and polling systems are relatively expensive and are used only for industrial subscribers and not for dwellings or small businesses. Furthermore, such systems used for industrial subscribers have not been programmed with any particular effort to reduce power use during on-peak periods, or to spread power use over off-peak periods so that the Power Company load is spread more evenly over a twenty-four hour period.

These power control systems for industrial subscribers have been used primarily to inhibit theft of energy and have not been used to promote more economical use of energy or to help the Power Company achieve a more even load. Spreading the power loads of industrial subscribers more evenly over a twenty-four period, for many Power Companies, would not have much effect on the Power Company's load profile. The reason for this is that for most Power Companies, by far the greater power load is not by industry and business, but by homes and dwellings. These prior monitoring systems used by industrial subscribers are too expensive for use in homes and dwellings. It is another object of the present invention to provide a relatively low cost controller for use in a home that is effective to shift several power uses therein from on-peak periods to off-peak periods without undue loss of subscriber comfort; and thereby spread power loads in the home more evenly over the twenty-four hour day, and at the same time provide monitoring by the Power Company to inhibit power theft. Such a controller installed and operating in a large percentage of the dwellings serviced by a typical Power Company would have a very considerable impact on the daily load profile of the Power Company and would reduce and spread the on-peak loads.

A Power Company would much prefer to reduce the on-peak loads even at the expense of raising the off-peak loads and so flatten the profile. At the present time, many Power Companies are unable to meet the highest on-peak loads from their own generating facilities and so must buy the power from other generating facilities and the cost is usually greater. Hence, Power Companies have for some time been seeking methods and means of controlling electric power uses in subscriber's homes and dwellings, because that will result in reducing on-peak loads and still supply the subscriber's needs.

SUMMARY OF THE INVENTION

According to the present invention, an electric power control system is provided for controlling AC power uses in an electric Power Company's subscriber's premises so that electric power is used according to stored programs. The system at the subscriber's premises includes a small envelope (a few hundred cubic inches) containing elements of a simple computer that has a central processing unit (CPU) micro-processor integrated circuit (IC) chip, an electrically programmable read only memory (EPROM) IC chip (also called a ROM chip) a random access memory (RAM) IC chip, input and output (I/0) IC chips, a system clock circuit and a real-time clock and calendar circuit. In addition, outside of this computer the system includes load power, temperature and other parameter detectors that provide premises inputs to the computer and power limiters that may be switches or modulators controlled by outputs from the computer for each of several controlled loads in the premises. The techniques of signalling between the computer and the sensors and limiters include; by dedicated wires, by radio, by infra-red radiation and by power line carrier (PLC).

In operation, the EPROM holds the computer firmware control program (the fixed firmware) and the RAM holds the firmware variable data (the variable firmware) that is input by the Power Company. All of this is sometimes referred to herein as the firmware programs. Inputs from the premises are 2150 stored in the RAM chip. The computer, operating according to the firmware programs and using the stored premises inputs from the RAM, produces output signals that are applied to the load limiters (power switches or modulators), so that the loads (power uses) are limited in accordance with the firmware programs and stored inputs. In a preferred embodiment, the firmware variable data can be varied by the Power Company at just about any time in a few seconds over the public telephone line via the subscriber's telephone line modem without inconveniencing the subscriber's use of the telephone line.

A particular example of power use control is the control of the premises hot water heater. For this, the unit controls power to the premises hot water heater by computing from the premises input data according to the fixed and variable firmware the power input to the heater required to regain a desired scheduled thermal energy storage level at programmed rates throughout the day. Details of this operation for the hot water heater are described more fully in co-pending U.S. patent application Ser. No. 374,156, filed Jun. 29, 1989, abandoned, entitled "Power Load Control System For Electric Hot Water Heater" by Dirk Duys and assigned to the same assignee as the present application.

The computer unit may be totally contained in a relatively small envelope and so is easily hand portable and can be mounted conveniently on the premises electric service box where circuit breakers and/or fuses are located, or it can be located near or on the premises hot water tank as described in said co-pending US patent application.

The firmware program contained in the computer EPROM includes the Power Company program predetermined to control the subscriber's automatic use of electric power, for the purpose of reducing the Power Company on-peak loads. Thus, the fixed firmware program in the EPROM may itself determine the frequency or time for communicating with the Power Company to change or modify the firmware variable data, and with each change in this data, the frequencies and times for those communications may be reprogrammed. The entire fixed firmware program in the EPROM can also be changed by the Power Company. For example, it could be changed periodically by a Power Company employee at the subscriber's premises.

As mentioned above, the firmware program variable data can be varied by the Power Company via the subscriber's telephone line. For subscribers who do not have a telephone line, the firmware variable data would be inserted periodically by a Power Company employee at the subscriber's premises. The firmware variable data includes the premises load power limits and the real time intervals for applying the load limits.

It is an object of the present invention to provide methods and means of controlling automatic electric power uses in a subscriber premises according to programs provided by the electric Power Company.

It is a further object of the present invention to provide such methods and means which does not interfere unduly with the subscriber's usual demand for electric power and does not interfere unduly with the subscriber's usual comforts from automatic uses of electric power.

It is another object to provide an improved electric power control system for installation and use in a subscriber's premises that enables the electric Power Company to bring to the premises electric power use programs that tend to spread the premises electric power use evenly over the period of a day or more, so that the Power Company can more economically provide power, all without interfering unduly with the subscriber's usual demand for electric power and without interfering unduly with the subscriber's usual comforts and uses of electric power.

These and other features and objects of the present invention are incorporated in specific embodiments of the invention that are described herein in conjunction with the drawings.

DESCRIPTION OF THE DRAWINGS

FIG. 11 shows some of the computer output control circuits;

FIG. 12 shows the KYZ input interface from various meters in the premises such as electric, gas, water, etc;

FIG. 13 shows the network interface circuits;

FIG. 14 shows the subscriber's telephone modem control initiation circuit;

FIGS. 15a and 15b show heater element power control pulses from the unit that control, for example, a heating elements for relatively low and high power, respectively, to the element;

FIGS. 16a and 16b show the AC line power cycles to the heating element that correspond to the control pulses of FIGS. 15a and 15b, respectively; and FIGS. 17 and 18 are charts for which the abscissa is hours over the twenty four hour period beginning at 7:00 AM of a work day and continuing to 7:00 AM of the next day, of which: FIG. 17 shows the typical Power Company load in megawatts over that period; and FIG. 18 shows typical domestic subscriber's use of hot water in gallons over that period and use of power to a conventional hot water heater to supply the hot water.

DESCRIPTION OF EMBODIMENTS OF THE INVENTION

Load Management System

PLC Input and Output Signal Transmission

Figure 1:
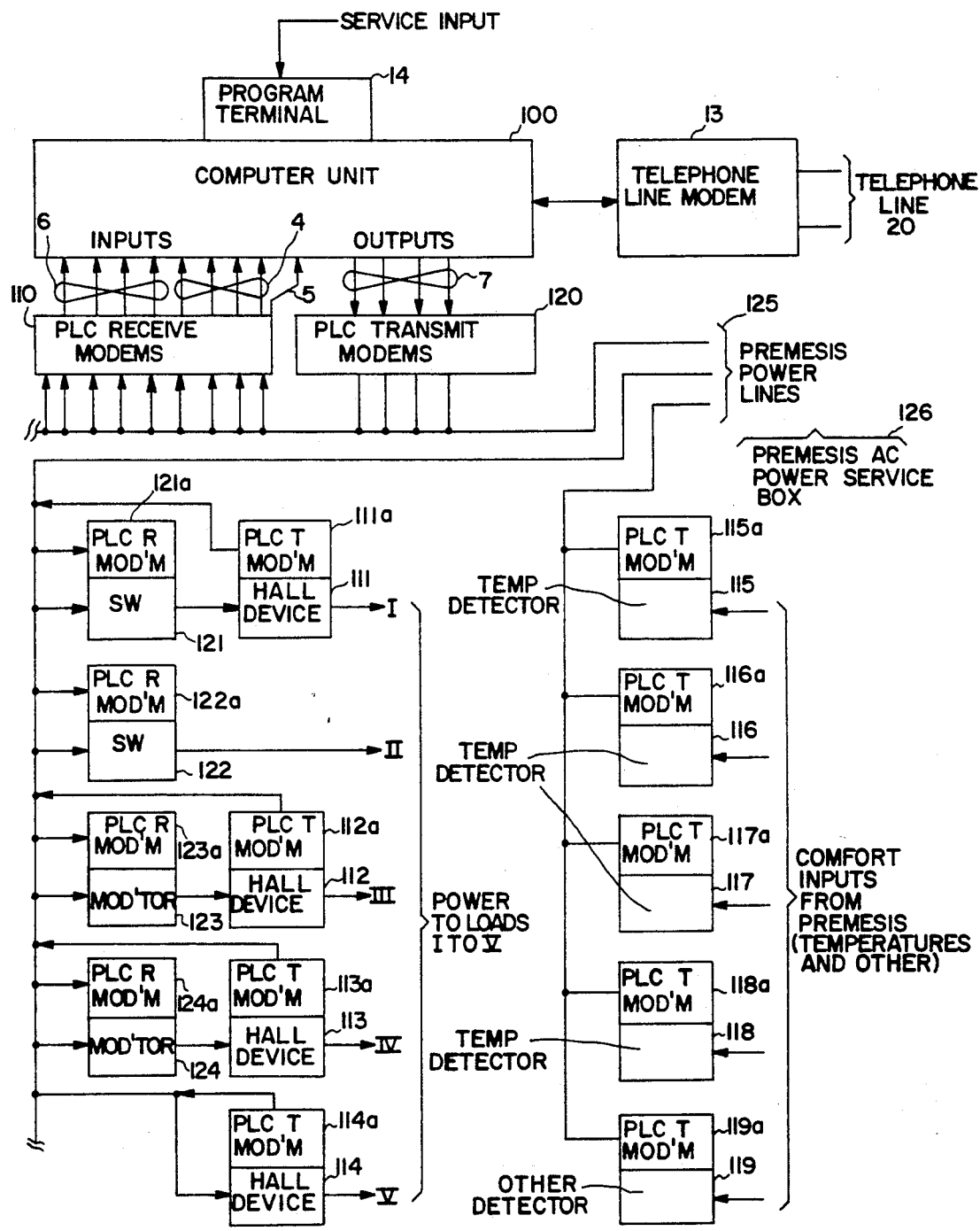
FIG. 1 is a system block diagram showing the premises power use (load) control computer and a PLC system for transmitting signals between the computer and the loads and premises comfort inputs.

FIG. 1 is a block diagram of the load management control system in a subscriber's premises incorporating many features of the present invention. The computer unit 100 has many inputs from the premises and outputs to the premises loads that are managed. Computer unit 100 may be contained in a small envelope, a few hundred cubic inches in size.

In this embodiment, the inputs are fed to unit 100 via PLC receiver modems 110 and those inputs include power use signals from Hall effect devices 111 to 114 and comfort and electric hot water heater inputs from temperature detectors 115 to 118 and inputs from "other" detector 119. Each Hall effect device is accompanied by a PLC transmitter (T) modem 111a to 114a, respectively, and each comfort input is accompanied by a PLC transmitter (T) modem 115a to 118a. The other detector 119 may detect an electric, gas or water meter reading and is accompanied by PLC transmitter modem 119a.

The computer outputs are fed from computer 100 via PLC transmitter modems 120 to power switches 121 and 122 and power modulators 123 and 124. Each of these switches and modulators is accompanied by a PLC receiver (R) modems 121a to 124a, respectively. Hall effect devices 111 to 114 are in the power load lines I, III, IV and V, respectively, between a switch or modulator and the load (use) I, III, IV and V controlled by the switch or modulator.

All loads that are controlled by the computer are not necessarily monitored by a Hall effect device. For example load II is not monitored by a Hall effect device. All loads that are monitored are not necessarily controlled. For example, load V monitored by Hall effect device 114 is not controlled by the computer.

The power switches and modulators controlled by the computer outputs are in the power line 125 in series with the load controlled. Loads like baseboard heaters, hot water heaters, heat pumps and dryers are often each on a dedicated fuse or circuit breaker, and so for those loads, the switch or modulator is most easily connected to the dedicated power line at the premises AC power service box 126. For loads that are plugged into power receptacles in the premises, the power switches and modulators may be located at the same receptacle and may simply be plugged into the receptacle, and the load, in turn, plugged into the switch or modulator.

Each switch and modulator and its associated PLC R modem and each Hall device and detector and its associated PLC T modem may be provided in a unitary package and all are powered by line voltage.

The PLC transmitter/receiver (T/R) units modems described herein are at modest cost and are particularly reliable for transmitting/receiving digital signals. A single pa&r of PLC modems can send input data from a load to the computer and receive a control signal from the computer to switch or modulate the load.

System Operation

Figure 2:
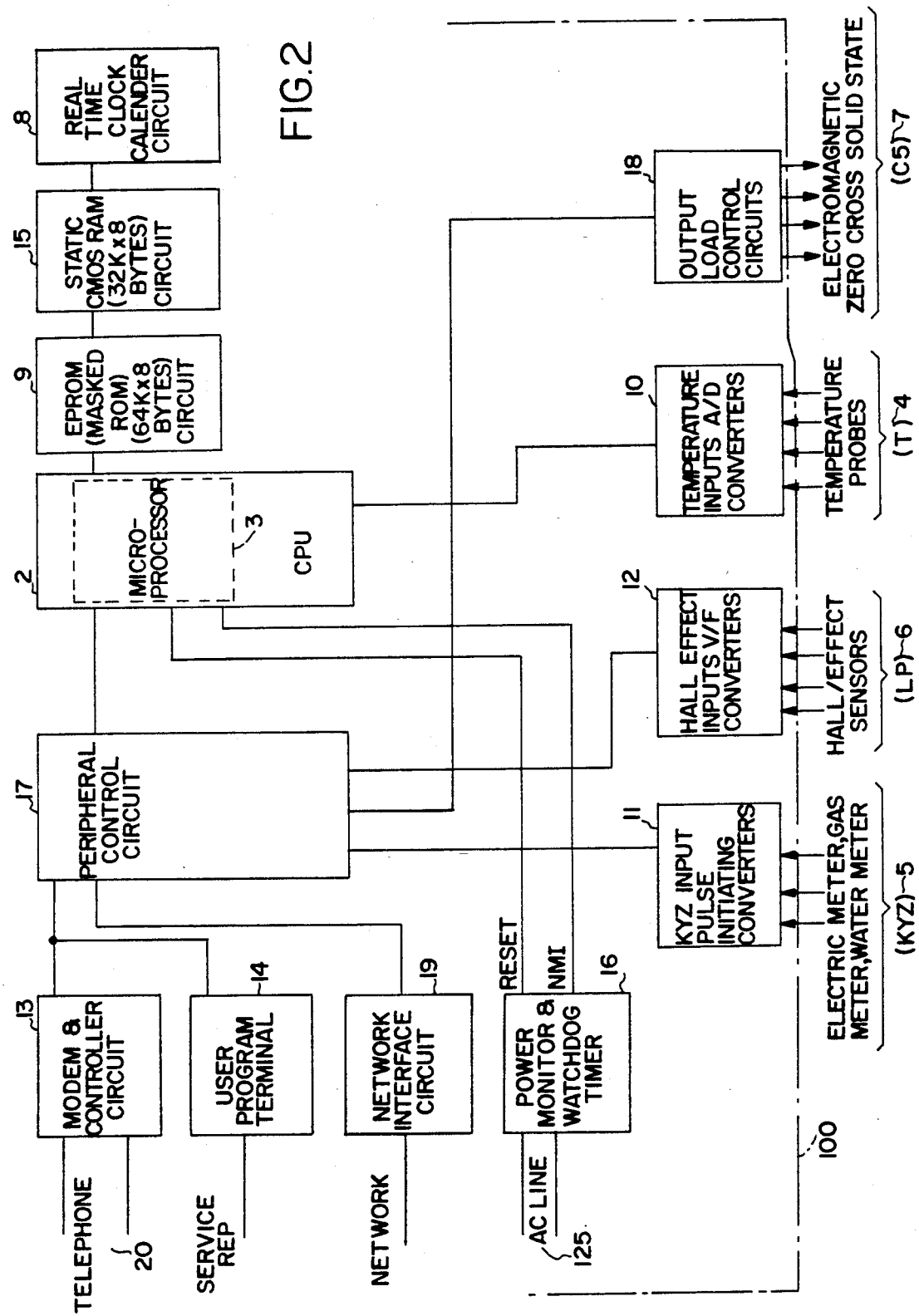
FIG. 2 is a system block diagram showing the computer CPU, RAM, ROM, real-time clock/calendar, input sensors of the premises including temperatures, various load power, one or more meter inputs, the computer program variable firmware input either from a terminal at the premises or via the subscriber's telephone line and output control circuits to limit or modulate various loads at the premises.

A block diagram of computer unit 100 of the load management system in the subscriber's premises is shown in FIG. 2. The computer CPU 2 includes a programmable microprocessor 3. The computer inputs from the premises include several temperature (T) inputs 4, load power (LP) inputs 6 and one or more meter inputs (KYZ inputs) 5 including the premises electric meter input. The computer outputs include several digital control signal (CS) outputs 7. Each of the outputs is intended to control electric power to a particular load, such as one of loads I to IV, that may be baseboard heaters, air conditioners, a heat pump, lights, a hot water heater, appliances, water pump, etc., and just about anything else in the premises that is powered by AC line power. For each type of load, a special hardware program for that type of load is contained in the CPU microprocessor 3. The particular embodiment described herein includes four inputs of load powers, for example loads I, III, IV and V (see FIG. 1), and four temperature sensor inputs. At least one of the temperature sensors is from the subscriber's hot water heater.

In computer 100, controls are initiated by the real time clock/calendar module 8 which produces signals representative of the time and the day (date). These time signals as well as temperature and electric power signals determine the control programs for the loads in the premises that are to be activated. The various load control programs are the fixed firmware programs held in EPROM 9; variable information including temperature inputs (T) from input A/D converters 10, KYZ meter inputs from pulse initiating input converters 11, Hall effect load power sensor inputs from voltage to frequency (V/F) input converters 12, and the firmware variable data inserted by the Power Company over the public telephone line 20 via the subscriber's modem and controller 13 or inserted by a Power Company representative at user program terminal 14, all stored in static RAM 15. For insertion of the firmware variable data by the Power Company over the public telephone line 20, suitable Power Company equipment 127 called "Power Company Firmware Variable Data Storage & Insertion Equipment" 127 feeds the firmware variable data to computer unit 100 in the subscriber's premises via the Power Company Telephone Line Modem 128, the Public Telephone Line 20 and the Subscriber's Telephone Line Modem & Controller 13. The data includes the various power load limits for the premises and the real time intervals during which the loads are limited.

The inputs 4, 5 and 6 shown in FIG. 2 are temperature transducer, meter and Hall effect device output signals that are converted for use in the computer by the associated converters 10, 11 and 12, respectively. More particularly, the temperature (T) inputs 4 are analog voltage levels representing temperature that are converted by A/D converters 10 to digital signals representing the temperatures; the KYZ meter inputs 5 are pulses from a set of relay contacts typical of pulse initiating meters that may be an electric, gas or water meter and pulse initiating converters 11 respond to the initiating signals from the meters producing suitable pulses for the computer to convert to the meter value; and the Hall effect device (LP) inputs 6 are dc voltage levels from Hall effect devices representing load power of loads I, III, IV and V and are converted in the computer to a power value for storage.

These same inputs 4, 5, and 6 can be detected remote from the computer and transmitted to the computer by power line carrier (PLC) as shown in FIG. 1. In that case, the inputs, 4, 5 and 6, directly from corresponding temperature transducers, meters and Hall effect devices, can be applied to PLC transmit modems and transmitted over the premises power line 125 to PLC receive modems 110 that feed the computer converters 10, 11 and 12. On the other hand, the inputs could be converted to digital form at the remote temperature transducers, meter and Hall effect device and the digital form transmitted by PLC to the receive modems 110 and fed in digital form to the computer CPU 2 or peripheral control circuit 17.

Figure 3:
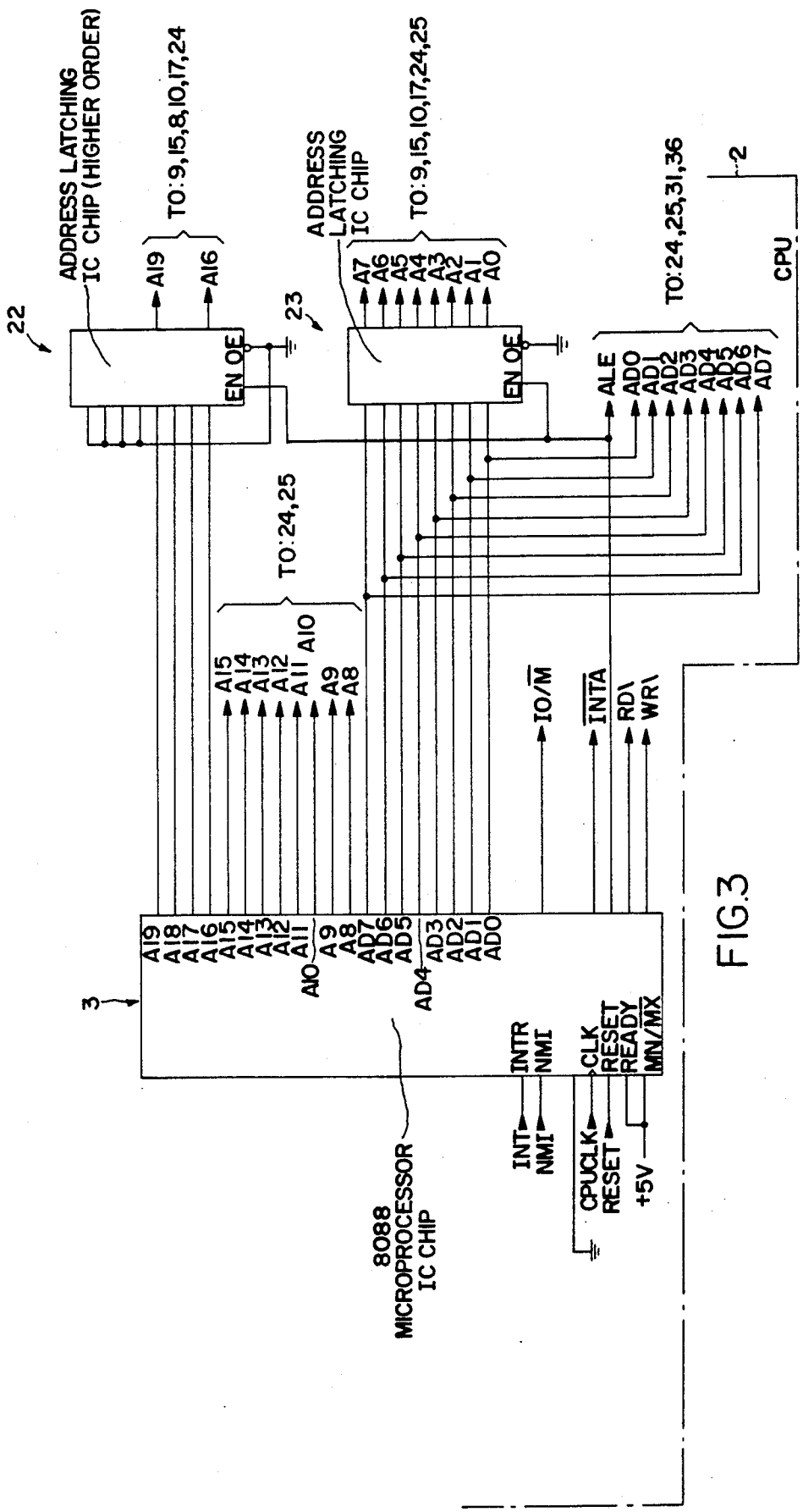
FIG. 3 shows details of the computer CPU including address latches and the microprocessor IC chip.

CPU 2 controls all of the functions of the total system in the premises in accordance with the firmware program including fixed firmware in EPROM 9 and variable firmware data inserted in static RAM 15. As shown in FIG. 3, inputs to microprocessor 3 in CPU 2 include "Reset" and "NMI" from power monitor and "watchdog timer" 16 and temperature inputs from temperature input A/D converters 10, as well as the stored information from EPROM 9 and static RAM 15. Outputs from the CPU are fed to peripheral controller 17 that generates the output load control signals to output load control circuits (CS) 18 and network interface signals to network interface circuits 19. Peripheral controller 17 also receives the KYZ inputs (electric meter, gas meter and water meter) from KYZ input converters 11 and also receives the Hall effect load power inputs from the various designated loads in the premises (loads I, III, IV and V), via Hall effect input converters 12.

Telephone line modem and controller 13 is controlled by peripheral control 17 to admit the firmware variable data from the Power Company to the computer. Operation of telephone line modem 13 is initiated by a code signal from the Power Company computer accompanying a telephone call from the Power Company, and when initiated, feeds the firmware program variable data sent by the Power Company computer to the subscriber's computer 100 which distributes that information to static RAM 15 for storage. This operation is described more fully hereinbelow with respect to FIGS. 19, 20 and 21.

As an alternative technique for inserting the firmware program variable data from the Power Company, the same data can be inserted via the user program terminal 14 by, for example, a service representative of the Power Company at the subscriber's premises and for that purpose, suitable terminals are provided on the unit for inserting the data.

Network interface circuits 19 serves to address, control and retrieve information from other devices that may communicate with the unit and is used particularly where the subscriber's premises is a business or industrial building having large and extensive power loads.

The Hall effect (LP) inputs 6 are from Hall effect sensors 111 to 114 that detect the magnitude of currents flowing through the associated load circuits in the premises. The Hall effect sensor is magnetically coupled to the power line feeding the load that it measures and it provides an AC voltage proportional to the load current as described more fully hereinbelow. The voltage from a Hall effect device is DC rectified and the resulting DC voltage is fed to a voltage to frequency (V/F) converter in converters 12 and the resulting frequency signal representing load power is fed to peripheral control 17 for conversion by the computer unit and storage in RAM 15. Temperature input converters 16 are essentially A/D converters that convert analog temperature signals sensed in the premises, such as for example, hot water heater water temperature that is a parameter in the determination of power control signals from the unit to the hot water heater, as described more fully in the above mentioned co-pending U.S. patent application Ser. No. 374,156.

KYZ inputs 5 provide electric, gas and water meter information signals from such meters at the premises. These meters are not shown in FIG. 1, but may each have a detector and a PLC T modem like other detector 119 and PLC T modem 119a for signalling the meter reading to the computer. From the KYZ pulse initiating input converters 11, these signals are fed to peripheral control 17 and initiate storage, display and/or transmission of the meter information if the firmware program inserted in the computer calls for such storage, display or transmission.

Output load control circuits 18 provide interfaces with electro-mechanical solid state relays that control the various designated load limiting mechanisms in the premises and so converters 18 distribute the primary intended effects of the system to the premises as control signals (CS) 7, to manage and control the power loads.

The peripheral control circuit 17 is the glue for the computer, as it provides the I/O hardware interface for the control outputs, the KYZ inputs, the Hall effect load power sensor inputs, the network interface and the remote communication via the telephone line modem and/or user terminal.

Computer Unit Structure and Operation

CPU and Address Latches

Turning next to FIG. 3 there is shown electrical details of the CPU microprocessor and address latches, all denoted 2 in FIG. 2. The CPU includes an 8088 microprocessor integrated circuit (IC) chip 3 and address latching IC chips 22 and 23. In all Figures herein, a signal and the line carrying the signal have the same designation.

In operation, data byte signals AD0–AD7, shown in FIG. 3, are transferred from microprocessor 3 to address latch 23. Under microprocessor control signal ALE, address signals A0–A7 from latch 23 are used for addressing EPROM 9, static RAM 15, A/D converter 10 and peripheral control 17. Status signals are transferred from the microprocessor to higher order address latch 22. Higher order address signals A16 and A19 exit from latch 22 under signal ALE and are used to decode the address space for EPROM 9, RAM 15, real time clock 8, A/D converter 10 and peripheral control 17.

As mentioned above, the CPU controls all of the functions of the system in accordance with the firmware program and it makes decisions based upon input information to control outputs, via output load control circuits 18, (see FIG. 11). The CPU makes decisions based upon input information to control the output relays via modulation or duty cycle techniques as described more fully hereinbelow. As also mentioned above, the CPU is also able to communicate to a remote host computer (Power Company computer) via the telephone line modem 13, or it can take such programming data from the user program terminal 14, inserted by for example a service representative of the Power Company (also shown in FIG. 10).

EPROM, RAM and I/O Decode Logic

EPROM 9 holds the firmware control program that performs the system functions. It also holds messages and system prompts for user and remote host computer functions. Static RAM 15 holds accumulated temperature, KYZ and Hall effect data. It also holds firmware program variable data and provides a communications buffer for the remote host computer and user terminal. The control programs for each of the outputs are assembled into RAM 15.

Figure 4:
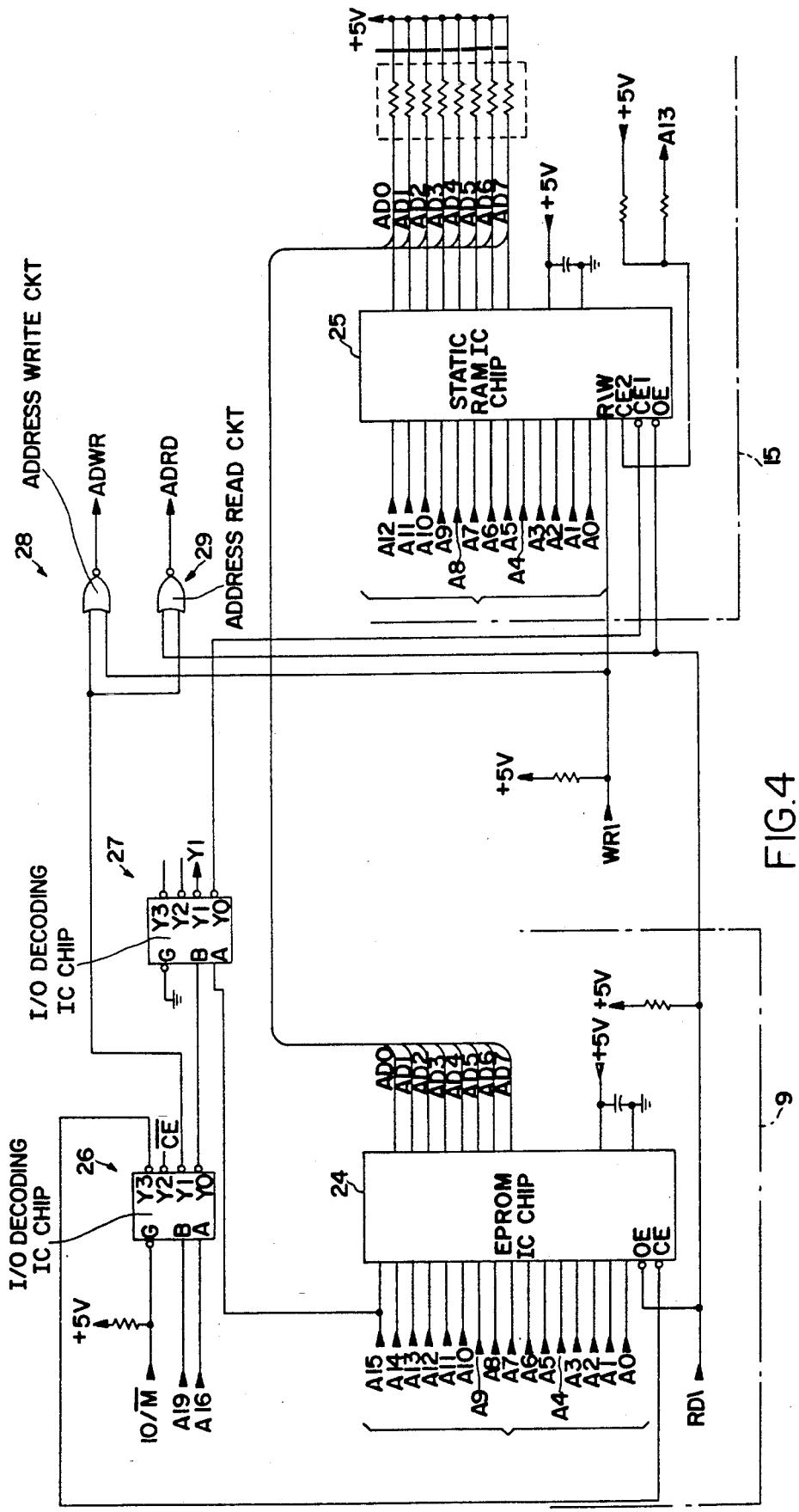
FIG. 4 shows the EPROM and static RAM with I/O decoder logic circuits.

Electrical details of the EPROM 9 and static RAM 15 circuits are shown in FIG. 4. These include EPROM IC chip 24 and static RAM IC chip 25; along with input/output decoding logic IC chips 26 and 27. Address write and address read circuits 28 and 29 combine address signals to complete the I/O decoding logic. Decoding logic chips 26 and 27 are used to derive the decoding signals from EPROM chip 24; RAM chip 25, clock circuit 8, peripheral control circuit 17 and A/D converters 10. This decoding logic decodes the address logic for the EPROM, RAM, clock, A/D converters and peripheral control. Signals RD and WR qualify the chip select signal for the A/D converters forming signals ADCWR and ADCRD, which are used to strobe address information for A/D channel selection and read the converted digital representation of analog values, respectively.

CPU Clock, Real Time Clock/Calendar & Interface Peripheral

Real time clock circuits 8 provide the CPU a method of keeping time and date and determining when the control programs are to be activated. Peripheral control 17 is the glue chip for the CPU. It provides the I/O hardware interface for the converters: KYZ inputs 11 and Hall effect inputs 12; and it provides the interface for output load control circuits 18, network interface 19, and remote communications via modem 13 and terminal 14.

Figure 5:
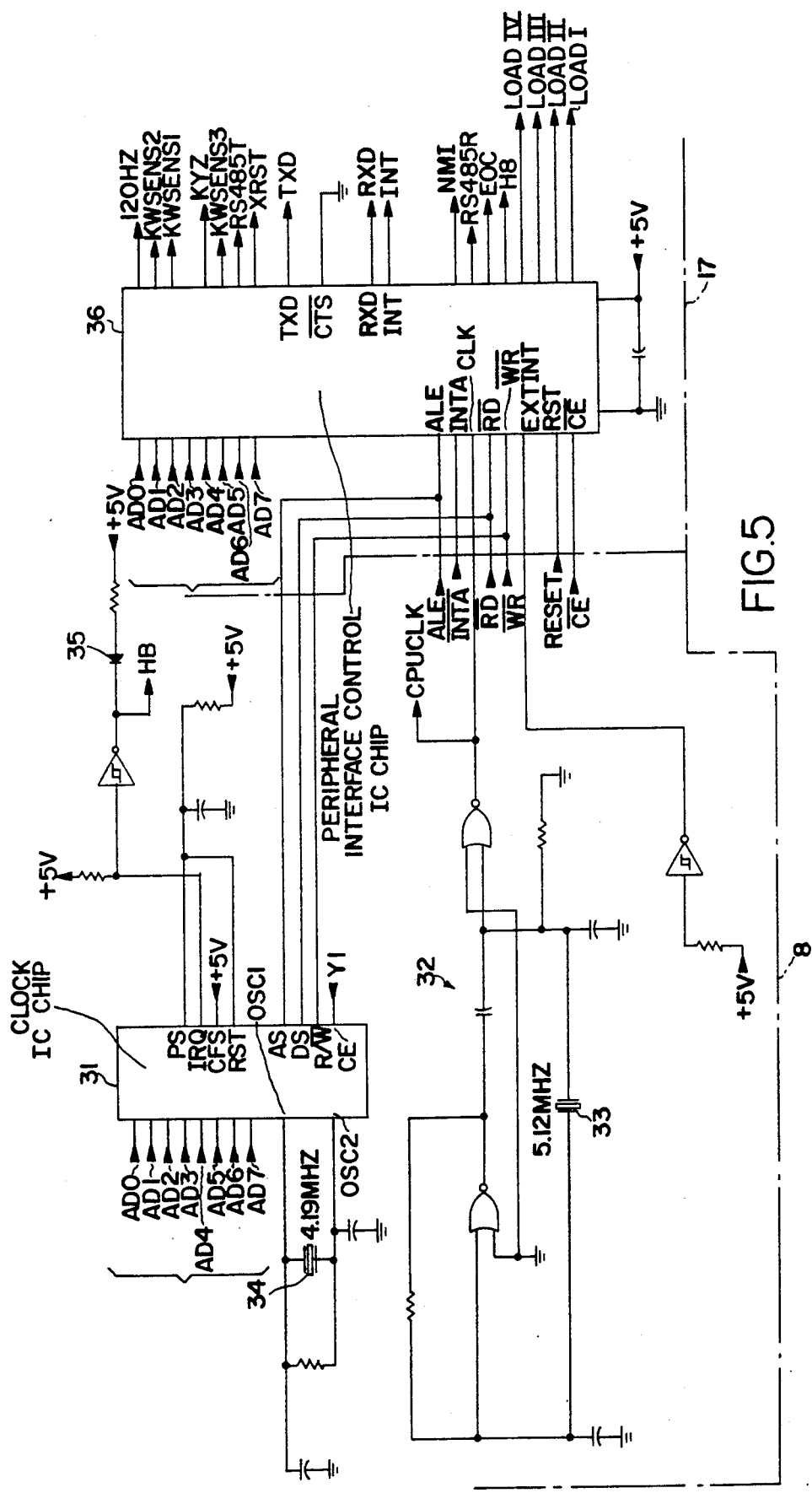
FIG. 5 shows the real-time clock, interface peripheral circuits and the CPU clock logic circuits.

Electrical details of clock circuits 8 and the peripheral control circuits 17 are shown in FIG. 5. These circuits include crystal controlled oscillators controlled by crystal 34 in clock IC chip 31 operating at 4.19 MHZ, the CPU logic circuits 32 including a 5.12 MHZ crystal 33 and peripheral interface IC chip 36. In operation, data bus signals AD0-AD7 flow to both clock chip 31 and peripheral control chip 36. Clock chip 31 provides time of day information to the microprocessor 3, via internal registers accessible by the microprocessor. These internal registers are continually updated via 4.19 MHz crystal 34 and are preserved via internal lithium battery source in clock chip 31, in the event of power failure. Signal IRQ is driven by the microprocessor as a "watchdog" output, and is used to flash light emitting diode (LED) 35 at a 1Hz rate in response to 120 Hz AC zero cross signals applied to peripheral control chip 36. The peripheral control chip also serves to output channel data to the output load control circuits 18 drivers, via the microprocessor, and receive KYZ pulses from KYZ converters 11 into internal timer/counter circuits of peripheral control chip 36, which are accessed by the microprocessor through internal registers addressed by data bus signals AD0-AD7 and address latch signals ALE and WR.

Hall effect frequency inputs are also input to peripheral control circuits 17, and are captured by a timer/counter register therein and are accessed via the microprocessor by data bus signals AD0-AD7 and control signals ALE and RD.

Serial data communication to a portable field terminal and built in internal telephone modem is provided by peripheral control circuits 17 peripheral control chip 36, via signals TXD and RXD, of which the speed is controlled by clock frequency (5.12 MHz) and internal control register on peripheral control chip 36, accessed by the microprocessor. Peripheral control 17 also serves to interface the network interface circuits 19 chip 54 (see FIG. 13), providing transmitted signals and receiving serial digital signals which are synthesized and decoded via peripheral control chip 36 and accessed via the microprocessor.

Power Supply, Watchdog Timer and A/D Converted Clock

Figure 6:
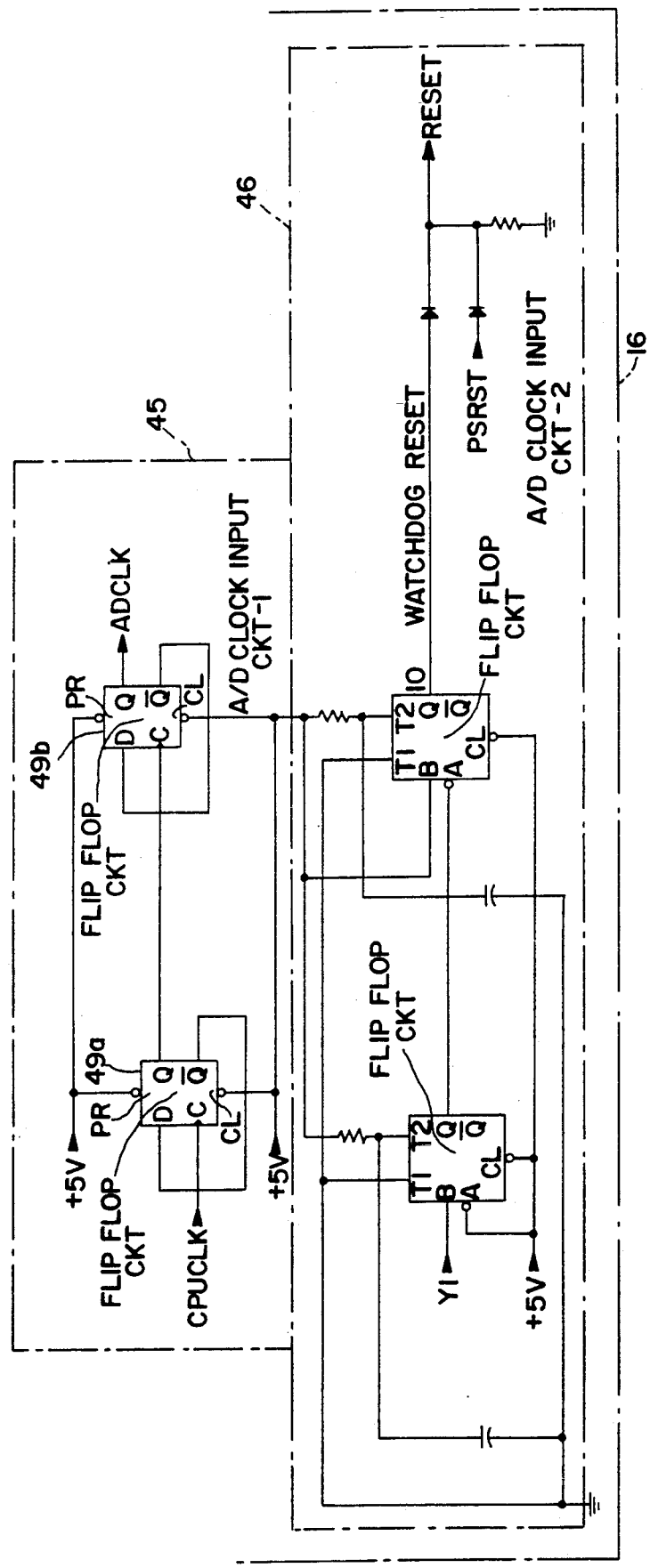
FIGS. 6 and 7 show the power supply and supervisory circuits, the "watch-dog" timer circuit and A/D converter clock circuits.
Figure 7:
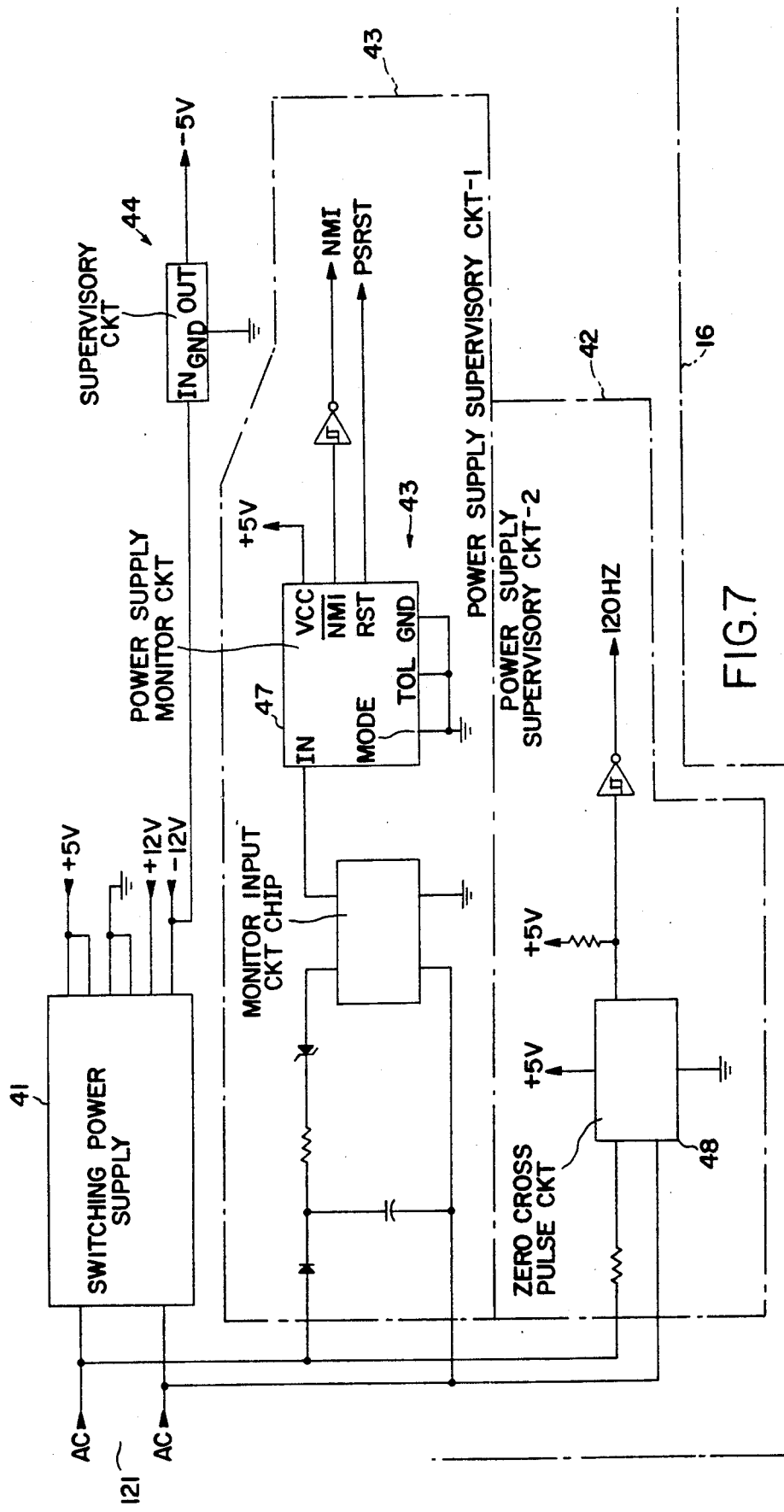

Electrical details of the power supply and watchdog timer 16 along with a clock synchronizing A/D converter and supervisory circuits are shown in FIGS. 6 and 7. These include power supply 41, powered by the subscriber's AC power line 125 and power supply supervisory circuits 42, 43 and 44 as well as A/D clock input converter circuits 45 and 46 that synchronize the system clocks with AC power line frequency. In operation, the switching power supply provides working voltages to all of the computer IC's. Power supply monitor circuit 47 serves to monitor +5 volt output as well as detect drops in applied AC line voltage. IC 48 produces a zero crossing pulse when the AC line voltage crosses zero volts. When the AC line voltage falls below 105 volts, the NMI pin of the microprocessor chip 3 is asserted (see FIG. 3), forcing the microprocessor into a service subroutine to process the condition. When the +5 volt supply falls below 4.75 volts, the reset pin to the microprocessor is asserted, forcing the microprocessor into a RESET condition.

The A/D clock input converter circuit 45 includes dual flip-Flop circuit 49 that serves to divide the 5.12 MHz clock down to 1.25 MHz, suitable for the maximum clock allowed the A/D converter. Flip-flop 49 responds to clock signal CPUCLK (see FIG. 5) at 5.12 MHz and divides the pulse down to 1.25 MHz pulses ADCLK, as shown in FIG. 6.

Hall Effect Sensor Input Circuits the primary purpose of the Hall effect sensors is to detect the magnitude of current flowing through a circuit main that feeds a load, providing an AC voltage proportional to the current. That AC voltage is rectified and the resulting DC voltage is fed to a voltage to frequency (V/F) converter in Hall effect converters 12 and the frequency therefrom is fed to peripheral control circuits 17. The firmware program converts the frequency to a proportional number indicative of the power to the load, for storage and display and for computation of KWH.

Figure 8:
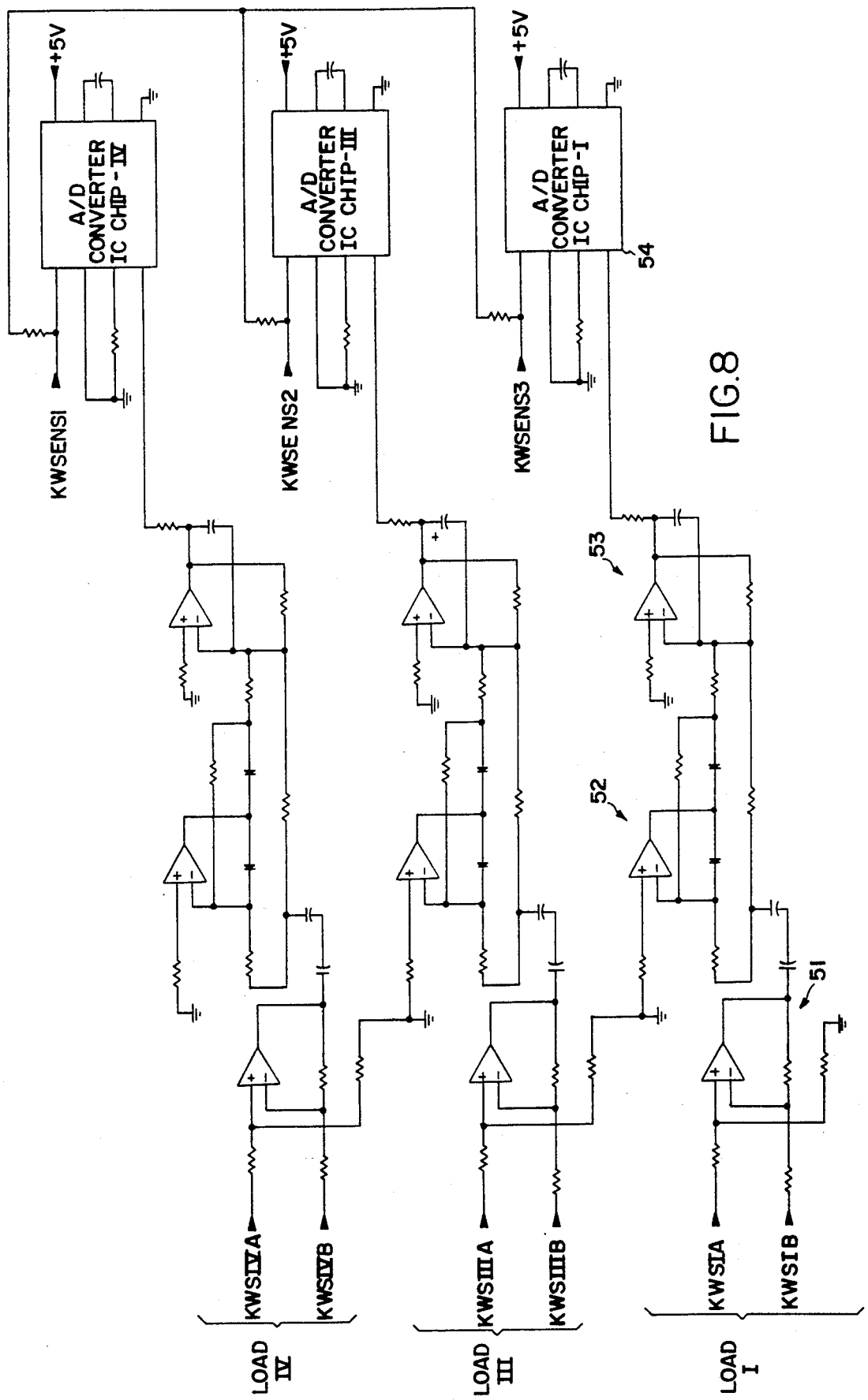
FIG. 8 shows the details of the Hall effect load power sensor voltage to frequency (V/F) converter circuits that interface to the peripheral control chip.

Electrical details of the Hall effect device input converters 12 are shown in FIG. 8. They include, as examples, the inputs designated I, III and IV from devices 111, 112 and 113 (see FIG. 1) that incorporate identical circuits. For example, input I (representing the power of load I) includes operational amplifiers 51, 52 and 53 and A/D converter IC chip 54 that feeds a digital representation of the power usage at a particular load in the premises to peripheral control circuits 17. In operation, a current passing through the Hall effect device magnetic loop, "donut", attached to the power line to a load such as load I, is converted to an emf proportional to the current flowing through the donut. This emf is ground referenced via operational amplifier 51 and is DC rectified by operational amplifier 52. The DC voltage is applied by amplifier 53 to A/D converter chip 54, which, in turn, converts voltage to frequency (V/F)

and the frequency is fed to peripheral control circuits 17. The frequency is stored in the timer/converter register of peripheral control circuits 17 and is accessed by the microprocessor via data bus lines AD0-AD7.

Temperature Inputs

Temperature sensors in the premises interface the computer via A/D converters 10. The sensors may derive their power from the computer and may be wired directly to converters 10, or, as shown in FIG. 1, input and output signal flow may be carried out using PLC technology. In either case, an analog voltage signal representative of a temperature input is converted to a binary number in converters 10 and that number is scaled by software to yield a number representative of the temperature that can be stored in the computer and displayed.

Figure 9:
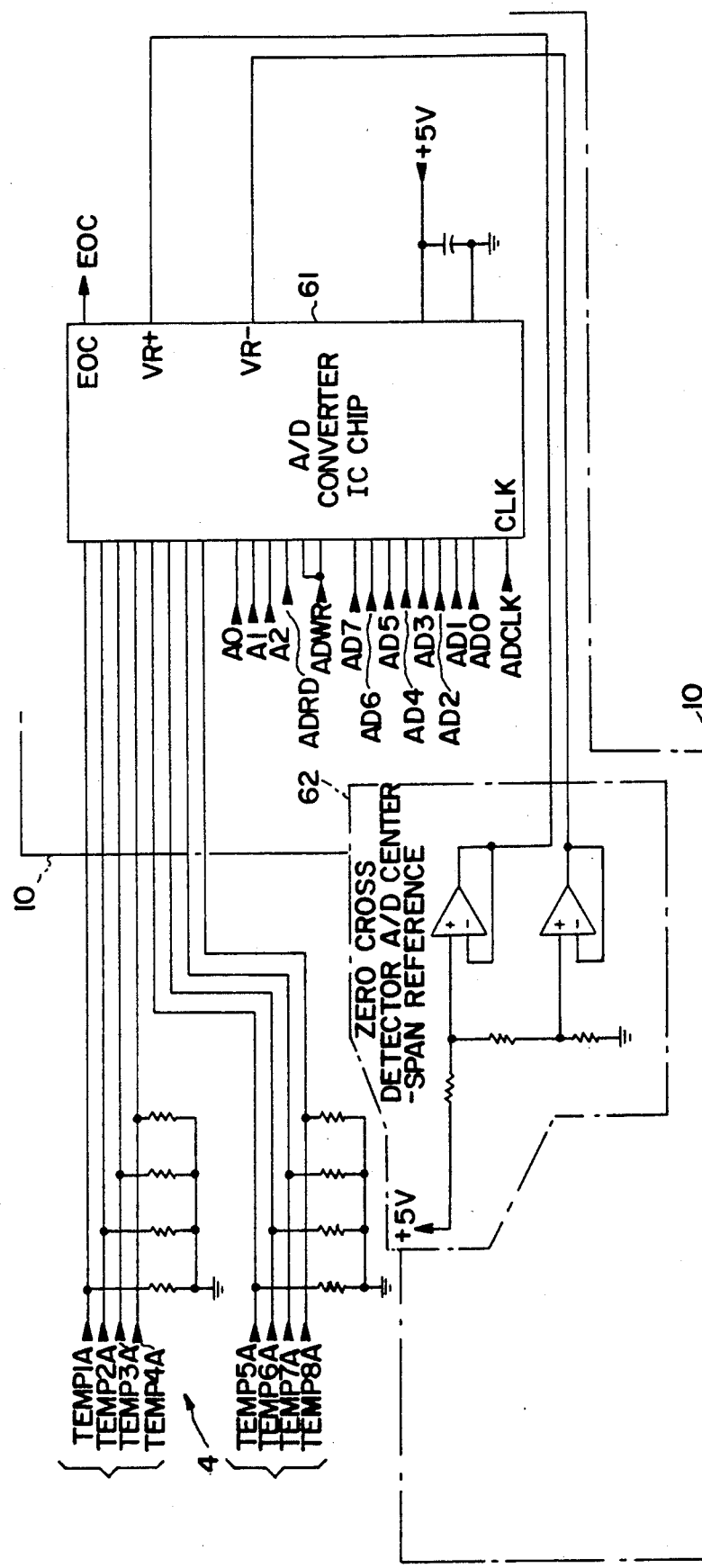
FIG. 9 shows details of the temperature sensors and their A/D converters to the CPU.

Electrical details of the temperature unput A/D converters 10 are shown in FIG. 9. They include temperature inputs 4, denoted 1A to 8A fed to A/D converter IC chip 61. As mentioned above, these temperature input signals may be AC signals of amplitude representative of the temperature that they represent. Also fed to IC chip 61 are signals representing the AC line zero crossing from zero cross detector 62. A/D converters 61 converts the AC temperature signals to corresponding digital numbers at the point of zero crossing of the AC signals and at those points the digital temperature numbers are reset by the converter. The A/D converter 10 digital number output is accessed by microprocessor 3 via data bus lines AD0-AD7 (see FIG. 3).

Modem Controller and User Program Terminals

Figure 10:
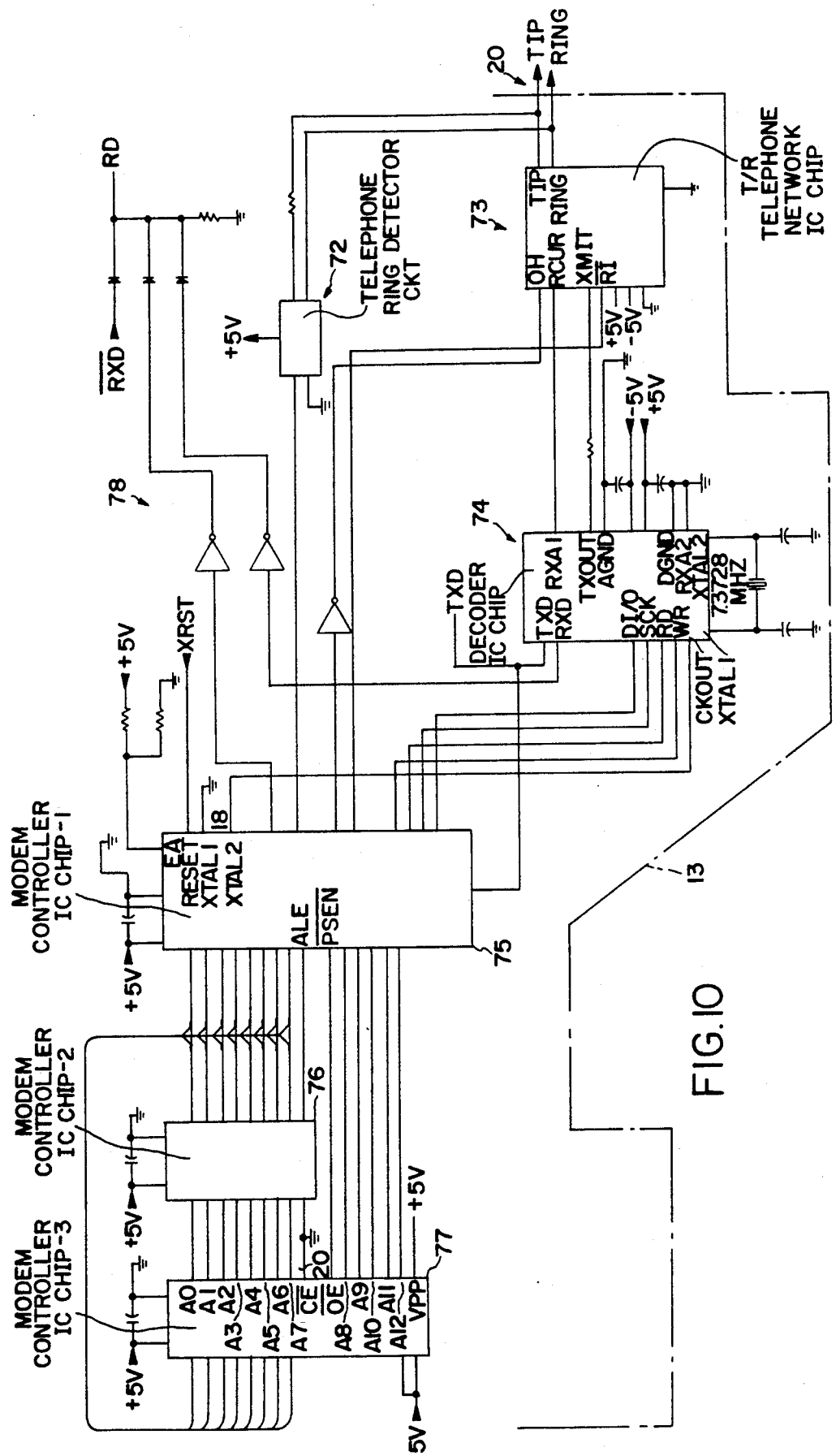
FIG. 10 shows details of a 300/1200 BPS modem and interface to the subscriber's telephone line by which a call is received over the public telephone line from the Power Company and feeds variable firmware data transmitted by the Power Company to the unit computer.

The telephone line modem is the primary vehicle by which the system communicates to a remote system (remote from the premises), like the Power Company computer. Electrical details of the modem and controller 13 are shown in FIG. 10. As shown in that figure, a 300/1200 BPS modem to the subscriber's telephone line of public telephone line 20 is provided. The telephone line 20 including tip and ring lines is coupled to ring detector circuit 72 and transmit/receive telephone network IC chip 73. When an incoming call is initiated by the Power Company computer, the first incoming ring signal is followed immediately by a disabling signal that is decoded in IC chip 74 and immediately initiates answering the incoming call at the modem before the first incoming ring signal can initiate a ring sound from any of the telephones in the premises.

Thus, the incoming telephone call from the Power Company computer properly coded is answered in the premises only by the modem and the other telephones in the premises do not ring. When the modem answers such an incoming call, it transmits an acknowledgment signal to the Power Company computer to initiate transmission of firmware variable data from the Power Company computer to be stored in the computer equipment 127, via modem 128 static RAM circuit 15. The processing of this firmware data is accomplished by IC chip circuits 75 through 79 in a fraction of a second.

Modem controller IC chip circuits 73 to 78 provide the primary device by which the subscriber's computer unit 100 communicates with the Power Company. This modem and controller is able to communicate in a two way alternate mode an so is able to answer the incoming call from the Power Company computer equipment (127 and 128) as described, as well as initiating a call to the Power Company computer equipment. In modem and controller 13 is a monitor circuit to detect when any of the phones in the premises have been taken off hook and which instructs the modem immediately to cease communication and hang up on the call to the Power Company computer equipment.

A firmware program in computer unit 100 is dedicated to the modem and so it may be tailored to any particular situation or protocol. For example, it may be tailored to the operation described above, whereby the modem answers an incoming call properly accompanied by a code signal from the Power Company computer equipment without allowing the premises phones to ring, and immediately thereafter, data flows between computer unit 100 and the Power Company computer equipment to accomplish the purposes of the system.

An alternate system in the unit may distinguish between incoming calls from the Power Company and regular incoming calls to the premises phone line by the fact that a call from the Power Company computer will ring only once. According to that technique, the first ring for all incoming calls is squelched and if there is no second ring signal it will mean that the call is from the Power Company computer (or that the calling party hung up after only one ring). In either case, modem and controller 13 will then answer the call and begin communication with the Power Company computer to initiate transmission of variable firmware data to computer 100. On the other hand, if there is a second ring, the modem will not answer and the rings may continue for regular use of the premises phone line. Clearly, these and other techniques of operating modem and controller 13 in conjunction with a Power Company computer may be employed to accomplish remotely feeding firmware variable data to computer 100 via the public telephone system.

KYZ Input, Network Interface and Modem Initiation

Electrical details of the KYZ input converters 11 of electric, gas and water meter data, the network interface circuits 19, the output load control circuits 18 and the telephone modem initiation circuit 13a are shown in FIGS. 12, 13, 11 and 14, respectively.

Output Control Circuits and Devices

Power usage of loads in a typical premises can be limited by simply not times of the day and that is the usual method of control. Loads that are pure resistance include electric heaters, lighting, cooking, hot water heater, etc. and of these, electric heaters and the hot water heater have thermostat controls.

Conventional electric heating usually includes one or more baseboard resistive heater units and a thermostat on the wall that connects by low voltage dedicated wires to a conventional power switch on the premises electric service box 122 (see FIG. 1) that houses the premises fuses or circuit breakers. The power switch is on or off depending on the thermostat signal.

FIG. 18 shows the hot water usage for a typical household over the 24 hour period beginning at 7:00 AM in the morning. As shown, the usage rate goes up from 5 to 25 gallons per hour at 9:00 AM and by noontime has dropped back to 5 gallons per hour and even lower by mid afternoon and then rises again to about 20 gallons per hour in the evening. For this sort of usage, almost a full tank load of hot water is used in the morning and just about another full tank load is used in the evening and very little is used in between.

A conventional hot water heater has one switch to the top heater element and another switch to the bottom heater element and both of these switches are attached to the outside of the water tank. The thermostat is a temperature sensor in the water that produces a signal that turns the switches on at high and low temperature levels and so these power switches are on or off, depending on the water temperature.

Controlling such thermostat controlled resistive loads according to the present invention may be accomplished by any of several techniques. One technique requires that the associated thermostat be totally bypassed by substituting in place of the conventional thermostat control signal to the conventional load switch, a load control signal from system computer unit 100. Another technique partially bypasses the thermostat by inserting a special load control switch or modulator controlled by computer 100 in series with the conventional load control switch so that the thermostat is still effective to turn power off, but is not necessarily effective to turn power on. This technique can be used in the system shown in FIG. 1. Some output control circuits of 18, herein called latch circuits, are shown in FIG. 11.

The output control circuits 18, in addition to the latch circuits shown in FIG. 11, may also include load power modulators (not shown herein). A suitable load power modulator for the thermostat controlled resistive loads in a premises may be an optically isolated silicon controlled rectifier (SCR) switch relay that functions similar to a variac to control current to the load. In this way a heater element load is driven at power below its rated power. For that purpose, the premises computer unit 100 produces resistive output control pulses via control output circuits 18 to a heater element load. These output pulses are in synchronism with the AC power frequency (60 Hertz) power excursions. The pulses are used directly to chop the excursions to reduce each excursion and so reduce the power to the load element to any value below the element rated value, down to zero, according to the stored program in computer 100. This operation is described fully in the above mentioned co-pending U.S. patent application Ser. No. 374,156.

Modulator output control pulses from computer 100 are synchronized with the AC power line frequency (60 Hertz so that the front edge of each pulse is exactly at the zero crossing of a power excursion. The power excursions are shown in FIGS. 16a and 16b. Each of these show three sequential excursions which each represent positive power above or below the zero line 81. The darkened area of each excursion represents power applied to the element and so FIG. 16a shows the power excursions applying less than half power while FIG. 16b shows power excursions applying more than half power. Where the relay is a typical solid state SCR relay, modulating pulses 82 as shown in FIG. 15a, which are relatively wide pulses block power over the pulse interval and so only the portion of the power excursion between pulses passes to the element. Similarly, as shown in FIGS. 15b and 15b, pulses 83 of short duration block only a small portion of the power excursion and so more power is delivered to the element. Computer unit 100 determines the length of the pulses applied to each of the element SCR relays and those pulse widths are variable in many steps between maximum and minimum, providing a wide range of variation of energizing power to the load element.

The advantages of modulating electric power to the elements of a typical hot water heater to carry out the purposes of the present invention are explained fully in said co-pending US patent application. An advantage of operating a load elements at lower than rated power is that the life of the element is extended. Switching an element on and off at full power results in high electric shock to the element. Such switching loads can be completely eliminated with the control unit 100 of the present invention. Instead of switching on suddenly to a given power level, it can come on slowly by gradually changing the pulse duration of the modulating pulses and so service life of the elements controlled in this way is longer and repairs are required less often.

Computer Inputs Transmission From Source to Computer

The location of computer unit 100 in the premises is dictated by the loads it controls. Where the only load controlled is the hot water heater, it can be located on the hot water tank as described in said co-pending U.S. patent application Ser. No. 374,156 and since the only inputs are temperature(s) from the water in the tank these temperature input signals can be transmitted to the computer by dedicated wires.

The present invention is applicable to manage many loads, such as loads I to V (see FIG. 1). For example, it can manage electric heating, hot water, heat pump, lights, air conditioners, dish washer, washing machine, electric dryer, cooking, appliances, pumps, etc. Signalling between the load and computer 100 can be accomplished as described herein using LC technology or using dedicated wires, radio transmission, infra-red radiation, or using any combination of these and other techniques. PLC technology is a particularly attractive option, because it entails lower installation costs and PLC T/R modems are available at modest cost and are particularly reliable for transmitting/receiving digital signals. A single pair of PLC modems can send input data from a load to the computer and control signals from the computer to the load.

Computer Programs

Technique of Relating Load Limits To Real Time Intervals

As mentioned above, EPROM 9 stores programs that relate: the actual premises load power such as drawn by loads I to V from the Hall effect inputs 12; the total premises load from the electric meter KYZ input 11; the premises temperatures T from temperature inputs 10; and the variable load limit and real time interval data from the Power Company; to determine the load control signals CS output from load control circuits 18 that control loads I to IV in the premises. For this purpose the EPROM storage includes functions of loads I to IV power limits versus real time intervals $\Delta t$ as a table.

Figure 19:
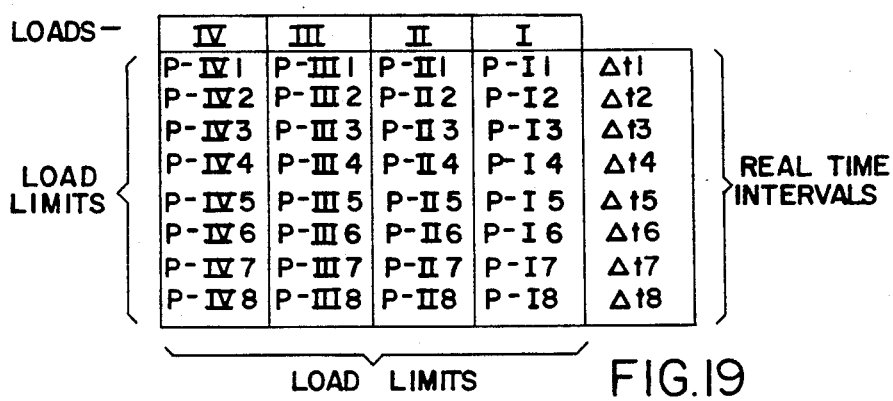
FIG. 19 shows a chart of real time intervals, Δt, versus load power limits for loads I to IV that represents the firmware variable data stored in the computer at the subscriber's premises that is inserted by the Power Company;.

One technique of relating the stored load I to IV power limits versus real time intervals $\Delta t$ in EPROM 9 is illustrated by the table in FIG. 19. The table shows the controlled loads I to IV power limits, P-I to P-IV, and real time intervals $\Delta t$ numbered $\Delta t1$ to $\Delta t8$. These numbers may represent successive predetermined intervals over a twenty four hour period. As shown, the power limits for loads I to IV during interval $\Delta t3$ are P-I3, P-II3, P-III3 and P-IV3. The programs use this load limit vs time interval data along with the KYZ, T and P inputs from the premises to compute the output load control signals CS from output 18. For example, during $\Delta t3$, the stored P-I3 from the table is compared with the actual load I power input signal from 12 (P-Ia) and when P-Ia exceeds P-I3, the switch 121 (see FIG. 1) that controls power to load I is cycled on and off according to the program; and in that way the average power used by load I during Δt3 is reduced.

As another example, during Δt3, P-III3 is compared with the actual load III power input signal from 12 (P-IIIa) and when P-IIIa exceeds P-III3, modulator 123 modulates the power to load III according to the program; and in that way the average power used by load III during Δt3 is reduced. In either case, if the actual power drawn by the load does not exceed the limit inserted by the Power Company, there is no switching on and off or modulating the actual power over that particular real time interval.

Figure 20:
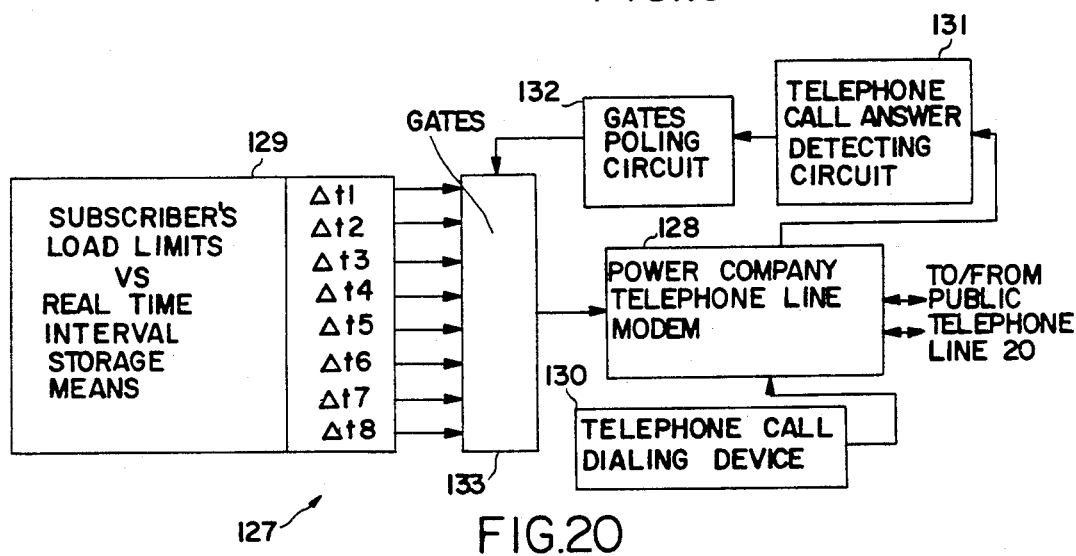
FIG. 20 is a block diagram showing some details of the Power Company Firmware Variable Data Storage & Insertion Equipment 127 shown in FIG. 1.

The information shown in the table of FIG. 19 is generated and stored in 127 by the Power Company. The block diagram of FIG. 20 shows some details of 127, the Power Company Firmware Variable Data Storage & Insertion Equipment shown and described with reference to FIG. 1. Equipment 127 includes, for this example, means 129 for storing the subscriber's latest load limit and real time interval data, all of which is generated by the Power Company. Means 129 is represented by the same storage of limits for the subscriber's loads I to IV for each of time intervals Δt1 to Δt8. A telephone dialing device 130 controls use of the Power Company's Telephone Line Modem 128 and telephone call answer signal detector 131 detects when a telephone call placed by the Power Company to the subscriber is answered and initiates operation of data gates poling circuit 132 that sequentially opens data storage gates 133, sequentially feeding the stored load limits for the time intervals Δt1 to Δt8, to modem 128. This sequence may be, for example: P-I1, P-II1, P-III1 and P-IV1, then P-I2, P-II2, P-III2 and P-IV1, and so forth. Thus, the load limit and real time interval data is down loaded from the Power Company facility to the subscriber's computer via the public telephone line 20.

Figure 21:
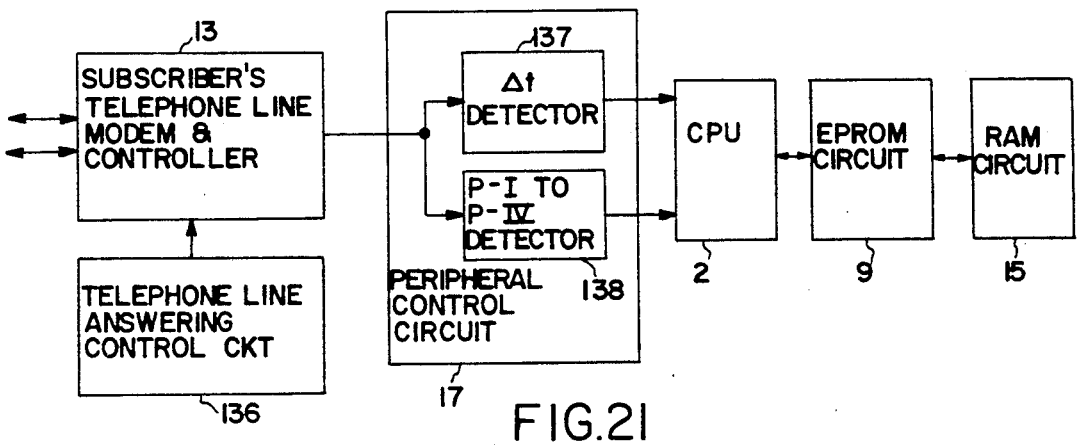
FIG. 21 is a block diagram showing some details of the computer at the subscriber's premises showing means for receiving and storing the firmware variable data (load limits and real time intervals) input to the computer by the Power Company.

As shown in FIG. 21, at the subscriber's premises means are provided for receiving and storing the load limits and real time interval data down loaded from the Power Company facility. That may include an automatic telephone answering control circuit 136 that controls the subscriber's telephone line modem 13 and, in effect, answers the telephone call from the Power Company facility so that the down loaded data is fed to the computer peripheral control circuit 17, where it is detected by time interval and power limit detectors 137 and 138 and fed in suitable form to CPU 2, which distributes this variable data for storage in RAM 15. As described hereinabove, this variable data and other variable data generated at the subscriber's premises is stored in RAM 15 and is used by the computer to determine the load power control signals CS output from the computer output load control circuits 18.

Some considerations that may be factors in determining the load control programs and the variable data down loaded from the Power Company facility are discussed below.

For Dish Washers and Washing Machines

The same program including fixed and variable firmware inserted by the Power Company in computer unit 100 can be used for several loads, particularly where there are no inputs to the computer from the load that are necessary for the computer program and where the load control signal is a simple on or off signal. For example, the programs for turning on power to the dishwasher and the washing machine can be the same, because both require hot water and can be turned on late at night during the Power Company off-peak period. Furthermore, they should not be turned on until the hot water supply has been replenished and one should follow the other so that both do not draw hot water at the same time.

For Food Preparation Appliances

Toasters, blenders, coffee makers, microwave ovens could all be turned on early in the morning before the first on-peak period to prepare foods for breakfast.

For Electric Heating, Air Conditioning and Heat Pumps

Both electric heating and a heat pump are not usually found in a premises and heating and cooling are not usually done at the same time. Hence controls for heating and cooling require different programs, although both may respond to the same temperature sensor.

For Hot Water Heater

Programs for a typical two heater element domestic hot water heater are described in the above mentioned co-pending U.S. patent application Ser. No. 374,156.

CONCLUSIONS

The specific embodiment described herein is a control unit for management of a plurality of power loads in a typical domestic premises (subscribers premises) for controlling electric power to the loads according to programs inserted by the electric Power Company to reduce subscriber demand for electric power over the Power Company on-peak periods and spread that demand over the Power Company off-peak periods. This embodiment incorporates many features that have useful application in other systems for other purposes as will be apparent to those skilled in the art without deviating from the scope of the invention as expressed in the claims.

What is claimed is:

1. An electric power control system for controlling AC line electric power usage in an electric Power Company subscriber's premises wherein electric power is distributed to one or more loads in said premises comprising at said premises,
   (a) means for limiting electric power use of at least one of said loads,
   (b) means for detecting electric power use of one or more power loads in said premises and producing power load signals representative thereof,
   (c) a computer device at said premises including:
   (d) means for storing data representative of limits for one or more of said loads for one or more predetermined real time intervals,
   (e) a computer clock producing signals representative of said predetermined real time intervals,
   (f) means responsive to said stored load limit and real time interval data and said power load signals for producing control signals for said load limiting means and
   (g) means for applying said control signals to said load limiting means; and
   (h) means controlled by said Power Company for varying said stored load limit and real time interval data, (i) whereby one or more of said loads is limited during one or more of said predetermined time intervals.

2. A system as in claim 1 wherein, at said premises,
(a) means are provided for detecting one or more temperatures relating to comfort in said premises and producing temperature signals representative thereof and
(b) said means for producing control signals is responsive to said temperature signals.

3. An electric power control system for controlling AC line electric power usage in an electric Power Company subscriber's premises wherein electric power is distributed to one or more power loads in said premises comprising at said premises,
(a) means for detecting electric power use of at least one of said loads and producing power load signals,
(b) means for limiting electric power use of at least one of said loads,
(c) a power line carrier (PLC) signal transmission system including a PLC transmit modem and a PLC receive modem on said premises power distribution system,
(d) a computer device at said premises and,
(e) means for transmitting said power load signals by said PLC signal transmission system to said computer device,
(f) said computer device including:
(g) means for storing data representative of limits for one or more of said loads for one or more predetermined real time intervals,
(h) a computer clock producing signals representative of said predetermined real time intervals,
(i) means responsive to said stored load limit and real time interval data and said power load signals for producing control signals for said load limiting means and
(j) means for applying said control signals to said load limiting means; and
(k) means controlled by said Power Company for varying said stored load limit and real time interval data,
(l) whereby one or more of said loads is limited during one or more of said predetermined time intervals.

4. An electric power control system for controlling AC line electric power usage in an electric Power Company subscriber's premises wherein electric power is distributed to one or more loads in said premises comprising at said premises,
(a) means for limiting electric power usage of at least one of said loads,
(b) a computer device at said premises including:
(c) means for storing data representative of limits for one or more of said loads for one or more predetermined real time intervals,
(d) a computer clock producing signals representative of said predetermined real time intervals, producing control signals for said load limiting means and
(f) means for applying said control signals to said load limiting means,
(g) whereby one or more of said loads is limited during one or more of said predetermined time intervals; and
(h) means controlled by said Power Company for varying said stored load limit and real time interval data.

5. A system as in claim 4 wherein,
(a) said computer includes a microprocessor IC chip, a ROM IC chip and a RAM IC chip,
(b) said means responsive to said stored load limit and real time interval data is a program stored in said ROM and
(c) said stored load limit and real time data is stored in said RAM.

6. A system as in claim 4 wherein, at said premises,
(a) means are provided for detecting one or more temperatures relating to comfort in said premises and producing temperature signals representative thereof and
(b) said means for producing control signals is responsive to said temperature signals.

7. A system as in claim 6 wherein,
(a) said Power Company's operation includes high load periods and low load periods,
(b) a computer program is stored in said computer device and,
(c) said load limit data, said real time interval and said computer program are such that said loads are limited to reduce said subscriber demand for AC electric power for said loads over said Power Company high load periods and spread that demand over said Power Company low load periods in view of said temperature signals relating to comfort in said premises.

8. A system as in claim 4 wherein, (a) said means controlled by said Power Company for varying said stored load limit and real time interval data includes a source of said load limit and real time interval data controlled by said Power Company and (b) means are provided for opening a telecommunication line of the public telephone system available at said subscriber's premises and available to said Power Company between said source and said computer device at said premises for transmitting said data from said source to said computer device.

9. A system as in claim 8 wherein, (a) said means for opening a telecommunication line includes a telephone line to said premises from the public telephone system, a telephone line modem on said premises telephone line and means for coupling said modem to said computer device.

10. A system as in claim 4 wherein, (a) said means controlled by said Power Company for varying said stored load limit and real time interval data includes an input to said computer device accessible to said Power Company.

11. A system as in claim 4 wherein,
(a) said Power Company's operation includes high load periods and low load periods,
(b) a computer program is stored in said computer device and
(c) said stored load limit and real time interval data and said computer program are such that said loads are limited to reduce said subscriber demand for AC electric power for said loads over said Power Company high load periods and spread that demand over said Power Company low load periods.

12. A system as in claim 4 wherein,
(a) said computer device includes means providing a terminal at said subscriber's premises by which the Power Company can electrically couple digital signals representing said variable stored data to said computer device.

13. A system as in claim 4 wherein, (a) a source of said stored load limit and real time interval data controlled by said Power Company is provided,
(b) said system has access to a public telephone line,
(c) said system includes a telephone line modem that is coupled to said public telephone line,
(d) said telephone line modem is coupled to said computer device and
(e) means are provided for initiating a telephone call between said source controlled by said Power Company and said modem,
(f) whereby signals representing said data are received by said modem from said telephone line and coupled from said modem to said computer device.

14. A system as in claim 13 wherein,
(a) a computer program is stored in said computer device,
(b) means are provided coupled to said computer device and accessible to said Power Company for electrically coupling signals representing said program to said computer device,
(c) whereby said stored load limit and real time interval data and said computer program in said computer device in said premises are controlled by said Power Company.

15. A method of controlling AC line electric power usage in an electric Power Company subscriber's premises wherein electric power is distributed to one or more loads in the premises comprising the steps,
(a) storing data representative of limits for one or more of said loads for one or more predetermined real time intervals,
(b) varying said stored load limit and real time interval data by said electric Power Company,
(c) producing signals representative of said predetermined real time intervals and
(d) producing control signals for limiting said loads in response to said stored load limit and real time interval data and
(e) applying said control signals to to limit said loads,
(f) whereby one or more of said loads is limited during one or more of said predetermined time intervals according to said data varied by said Power Company.

16. A method as in claim 15 and including the step of,
(a) varying said stored load limit data by said Power Company via the public telephone line.

17. A method as in claim 15 and including the step of,
(a) varying said stored real time intervals by said Power Company via the public telephone line.

18. A method as in claim 15 and including the steps of,
(a) varying said stored load limit data and varying said stored real time intervals by said Power Company via the public telephone line.

* * * * *